United States Patent
Ditzler

(10) Patent No.: US 9,061,759 B2
(45) Date of Patent: Jun. 23, 2015

(54) CAM-OPERATED BI-DIRECTIONAL SHOCK ABSORBER DAMPER

(71) Applicant: Goodrich Corporation, Charlotte, NC (US)

(72) Inventor: Adam J. Ditzler, Keller, TX (US)

(73) Assignee: Goodrich Corporation, Charlotte, NC (US)

( * ) Notice: Subject to any disclaimer, the term of this patent is extended or adjusted under 35 U.S.C. 154(b) by 43 days.

(21) Appl. No.: 14/079,220

(22) Filed: Nov. 13, 2013

(65) Prior Publication Data
US 2015/0129381 A1 May 14, 2015

(51) Int. Cl.
*B64C 25/58* (2006.01)
*F16F 9/348* (2006.01)

(52) U.S. Cl.
CPC .............. *B64C 25/58* (2013.01); *F16F 9/3484* (2013.01)

(58) Field of Classification Search
CPC ......... F16F 9/145; F16F 9/516; F16F 9/3405; F16F 9/348; B60G 17/08; B64C 25/505; B64C 25/58; B64C 25/64; B64C 25/20; B64C 25/22; B64C 25/188

USPC .......... 188/313, 266.2, 281, 282.1, 317, 320, 188/322.15; 244/102 SS, 102 R, 100 R, 102 A
See application file for complete search history.

(56) References Cited

U.S. PATENT DOCUMENTS

| | | | | |
|---|---|---|---|---|
| 2,186,266 A | * | 1/1940 | Onions | 244/102 SS |
| 2,363,485 A | * | 11/1944 | Down | 267/64.15 |
| 2,376,678 A | * | 5/1945 | Foster | 244/104 FP |
| 3,677,561 A | * | 7/1972 | McNally | 280/124.157 |
| 4,284,255 A | * | 8/1981 | Masclet et al. | 244/102 R |
| 4,381,857 A | * | 5/1983 | Cook | 267/64.15 |
| 4,405,119 A | * | 9/1983 | Masclet et al. | 267/64.22 |
| 4,552,324 A | * | 11/1985 | Hrusch | 244/104 FP |
| 5,094,407 A | * | 3/1992 | Jampy et al. | 244/104 FP |
| 5,310,140 A | * | 5/1994 | Veaux et al. | 244/104 FP |
| 8,070,095 B2 | * | 12/2011 | Luce et al. | 244/102 SS |
| 8,459,417 B2 | * | 6/2013 | Masson et al. | 188/284 |
| 2010/0181423 A1 | * | 7/2010 | Martin et al. | 244/104 FP |

* cited by examiner

*Primary Examiner* — Thomas J Williams
*Assistant Examiner* — Mariano Sy
(74) *Attorney, Agent, or Firm* — Snell & Wilmer L.L.P.

(57) ABSTRACT

The present disclosure relates to cam operated shock absorber damper systems for use with landing gear. The cam operated shock absorber damper systems may comprise a cylinder and a piston mounted to slide telescopically in the cylinder and a snubber ring comprising rebounding orifices and compression orifices.

15 Claims, 7 Drawing Sheets

CAM-OPERATED BI-DIRECTIONAL SHOCK ABSORBER DAMPER

FIELD

The present disclosure relates to cam operated shock absorber damper systems and, more specifically, to cam-operated bi-directional shock absorber dampers for use with aircraft landing gear.

BACKGROUND

Shock absorbers may be included on a variety of aircraft landing gear. Aircraft landing gear typically include damping systems such as a shock absorber to control loads during landing and ground maneuvering and to control bounce of an aircraft while in contact with the ground (e.g., during landing or running over a disturbance on a runway). In some cases, it may be desirable for the initial compression of a shock absorber during landing to not absorb much energy and allow a relatively undamped compression, but it may also be desirable to allow the shock absorber to have full capability to dampen shock strut extension to prevent excessive bounce or loads on the landing gear

SUMMARY

The present disclosure includes systems comprising an upper bearing carrier, wherein the upper bearing carrier includes an upper bearing carrier cam surface, and an upper bearing carrier orifice, wherein the upper bearing carrier orifice is disposed substantially perpendicular to the upper bearing carrier cam surface, a snubber ring comprising a snubber ring compression orifice, a snubber ring rebounding orifice, and a snubber ring cam surface, wherein the snubber ring compression orifice and the snubber ring rebounding orifice are disposed substantially perpendicular to the snubber ring cam surface, a cylinder coupled to the upper bearing carrier, wherein a piston is mounted to slide telescopically within the cylinder, wherein, in response to an extension force, the snubber ring rotates with respect to the upper bearing carrier and the snubber ring cam surface engages the upper bearing carrier cam surface, causing the snubber ring compression orifice and the upper bearing carrier orifice to misalign.

The present disclosure also includes systems comprising an upper bearing carrier, wherein the upper bearing carrier includes an upper bearing carrier cam surface, and an upper bearing carrier orifice, wherein the upper bearing carrier orifice is disposed substantially perpendicular to the upper bearing carrier cam surface, a snubber ring comprising a snubber ring compression orifice, a snubber ring rebounding orifice, and a snubber ring cam surface, wherein the snubber ring compression orifice and the snubber ring rebounding orifice are disposed substantially perpendicular to the snubber ring cam surface, a cylinder coupled to the upper bearing carrier, wherein a piston is mounted to slide telescopically within the cylinder, wherein, in response to a compressive force, the snubber ring cam surface disengages from and rotates with respect to the upper bearing carrier cam surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice various embodiments disclosed herein, it should be understood that other embodiments may be realized and that logical, chemical and mechanical changes may be made without departing from the spirit and scope of this disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

The present disclosure includes cam-operated bi-directional shock absorber dampers which may be included in a variety of systems to create a damping effect in vehicles (e.g., articulating landing gear systems and cantilever landing gear systems in aircraft). Exemplary embodiments include the suspension or landing gear assemblies on construction vehicles, automobiles, cargo transport vehicles, and aircraft, which includes cargo planes, passenger airliners, helicopters, and military aircraft. Cam-operated bi-directional shock absorber dampers may help to increase the compression rate of landing gear assemblies, such as during landing.

Figure 1:
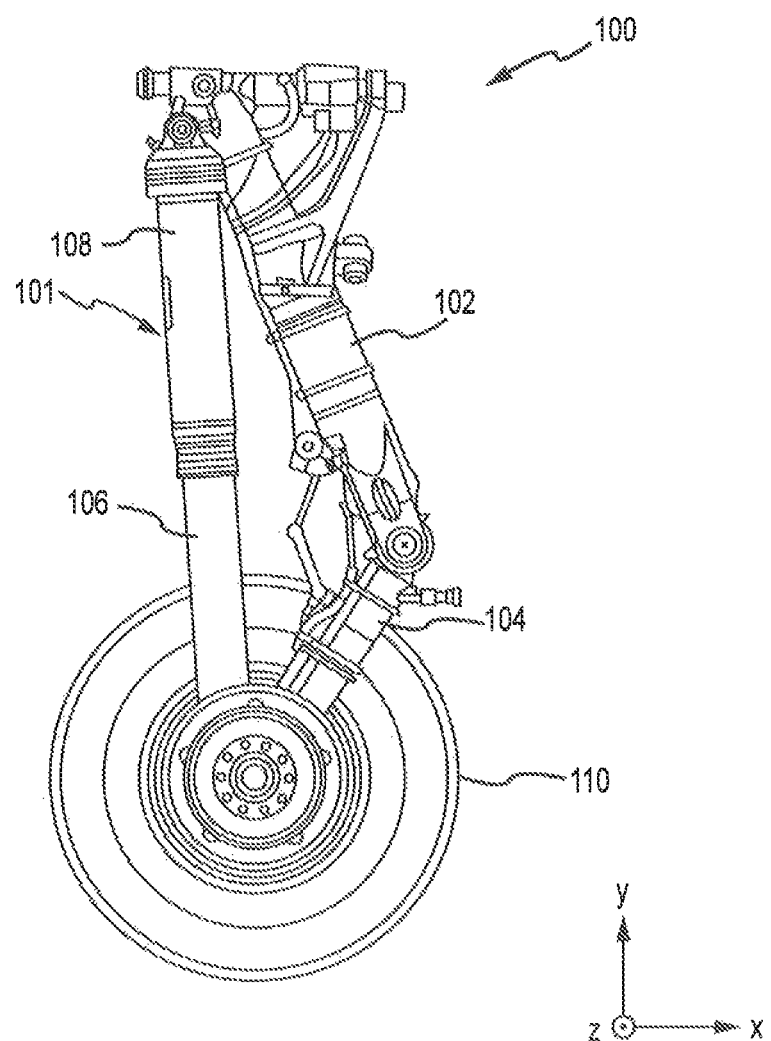
FIG. 1 illustrates a view of a landing gear.

With reference to FIG. 1, aircraft landing gear 100 is exemplified according to various embodiments. Aircraft landing gear 100 can incorporate a main post 102 and a trailing arm 104 attached via a joint. A shock strut 101 may extend between these two members so that the trailing arm 104 may articulate upward or downward (e.g., along the y axis). Typically the joint may be a forked clevis at the lower end of the main post 102, mating to the trailing arm 104. Trailing arm 104 may be connected to wheel 110. Cylinder 108 may be telescopically connected to piston 106, forming the shock strut 101.

Piston In-Stroke

Figure 2:
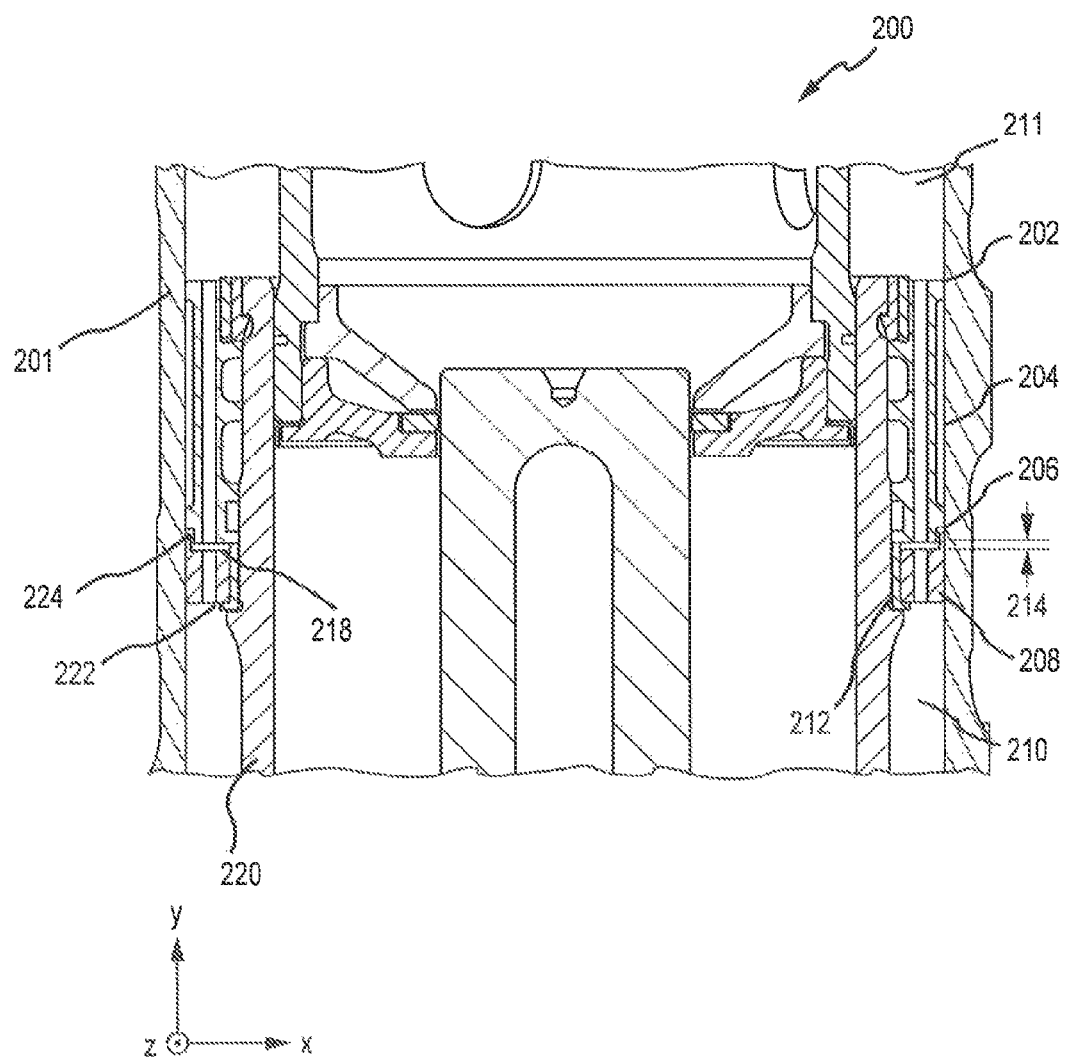
FIG. 2 illustrates a radial section view of a shock strut during piston in-stroke.

FIG. 2 illustrates a radial section view of a shock strut during compression of the shock strut (piston in-stroke).

Shock strut 200 described herein is the same as shock strut 300 (described below) and different reference numerals are used solely for ease of description and understanding in identifying the detailed features and operation during piston in-stroke and piston out-stroke. Furthermore, according to various embodiments, shock strut 101 (described above) may be the same as shock strut 200 and shock strut 300. Shock strut 200 may comprise a cylinder 201, piston 220, and a snubber guide 212 which surrounds piston 220. In various embodiments, the shock strut cylinder and piston may be cylindrical or substantially cylindrical in shape. Snubber ring 208 is proximate to piston 220 and snubber guide 212. Near distal end 218 of the snubber ring are upper bearing carrier 202, upper bearing 204, upper bearing cam surface 206 (which forms part of upper bearing carrier 202), reservoir 211, and near to a proximal end 222 rebound chamber 210 may be located. Snubber ring 208 may have a snubber ring cam surface 224 that may mate with upper bearing cam surface 206. Rebound chamber 210 may be a cavity which may be filled with hydraulic fluid and/or gas when shock strut 200 is compressed. A compressive force may cause compression of the shock strut 200. A compressive force may be a force that moves piston 220 in the positive y direction. An extension force may be a force that moves piston 220 in the negative y direction. Thus, the piston may move in response to compression or extension forces in the axial direction with respect to cylinder. During compression, gap 214 may form between upper bearing carrier 202 and snubber ring 208. This motion may allow rebound chamber 210 to become filled with hydraulic fluid, as shown in FIG. 4.

Figure 4:
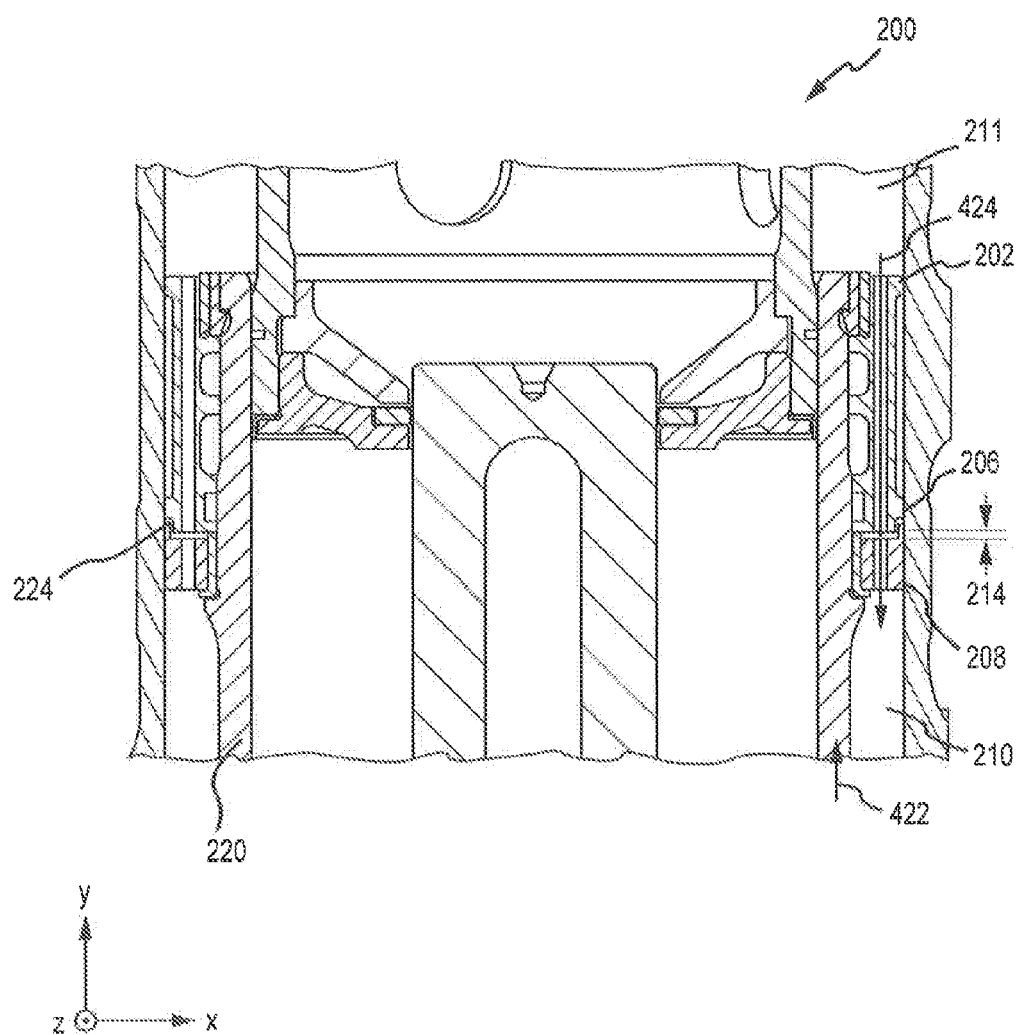
FIG. 4 illustrates a radial section view of a shock strut during piston in-stroke.

FIG. 4 illustrates fluid flow of radial section view of shock strut 200 during compression or piston in-stroke according to various embodiments. As piston 220 is compressed in direction 422, gap 214 is formed between upper bearing carrier 202 and snubber ring 208, allowing fluid to flow in compression flow direction 424 into rebound chamber 210 from reservoir 211. In various embodiments, fluid may flow in the compression flow direction 424 through a compression orifice. In various embodiments, the fluid flow in compression flow direction 424 is substantially unrestricted due to the simple flow path. Without being limited to any theory, it is believed that a substantially unrestricted simple flow path (e.g., one that does not require multiple changes in direction) can decrease the pressure drop across the snubber ring during compression (i.e., in-stroke).

Figure 8:
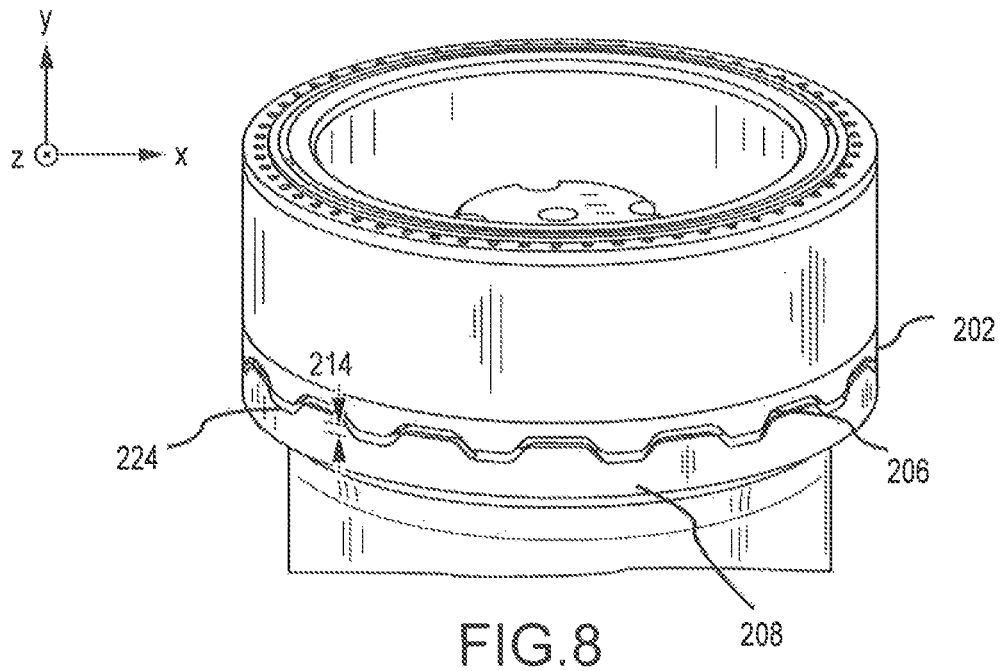
FIGS. 8 and 9 illustrate a piston during piston in-stroke.
Figure 9:
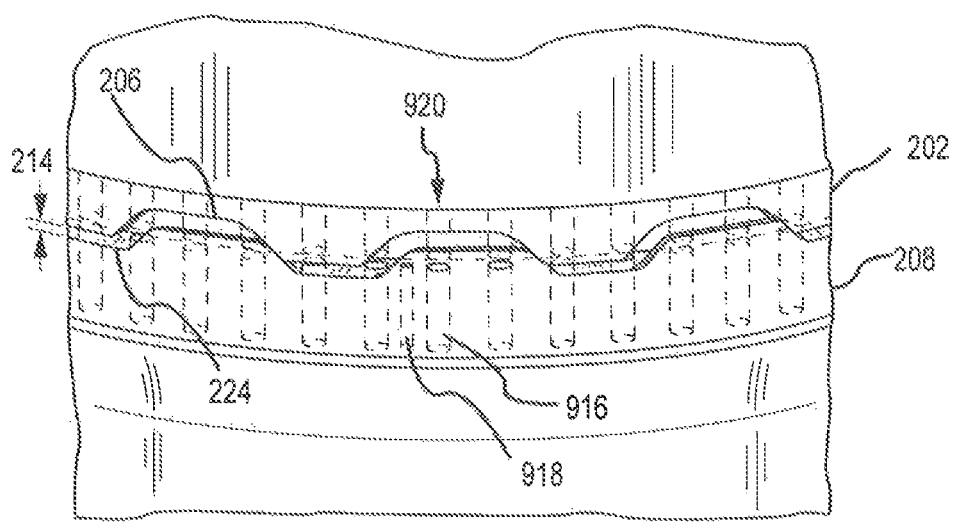

FIGS. 8 and 9, illustrate a shock strut according to various embodiments during piston in-stroke. During piston in-stroke, gap 214 is formed between upper bearing carrier 202 and snubber ring 208. FIG. 9 illustrates FIG. 8 having upper bearing carrier 202 and snubber ring 208 rendered transparently to show various orifices and the cylinder is not shown. Snubber ring compression orifice 916, snubber ring rebounding orifice 918, and upper bearing carrier orifice 920 are shown. In various embodiments, snubber ring compression orifice 916 and snubber ring rebounding orifice 918 can be substantially perpendicular to snubber ring cam surface 224. In various embodiments, upper bearing carrier orifice 920 can be substantially perpendicular to upper bearing cam surface 206 of upper bearing carrier 202. As used herein, the term "substantially perpendicular" may include forming an angle of 90 degrees±15 degrees. In various embodiments, the formation of gap 214 may allow or cause snubber ring 208 to rotate with respect to the upper bearing carrier 202 so as to substantially align snubber compression orifice 916 and upper bearing carrier orifice 920. In that regard, compression orifice 916 and upper bearing carrier orifice 920 may be substantially in alignment so fluid may flow through snubber compression orifice 916 and upper bearing carrier orifice 920. According to various embodiments, snubber ring may freely rotate or may be forced to rotate by interaction with another cam. In various embodiments, during piston in-stroke, the alignment of snubber compression orifice 916 and upper bearing carrier orifice 920 may allow hydraulic fluid to rapidly flow in compression flow direction 424 (shown in FIG. 4) into rebound chamber 210 (shown in FIG. 4).

This may allow rebound chamber to become quickly filled with hydraulic fluid in response to a compressive force. Filling the rebound chamber during piston in-stroke with lower resistance flow into rebound chamber 210 may help to prevent cavitation and may help to lower shock strut loads.

The fluid is not particularly limited and may include hydraulic fluid or other compressible fluids, gases, and mixtures thereof. In various embodiments the cam-operated bi-directional shock absorber damper may be an oleo pneumatic damper, which can include dampers that force oil into an air chamber, thereby compressing the air. Any suitable hydraulic fluid may be used in connection with the systems and methods disclosed herein. In various embodiments, suitable hydraulic fluids may include petroleum-based, water based, silicone based, and/or phosphate-ester based hydraulic fluids. In various embodiments, suitable hydraulic fluids that may be used include those that embody one or more of the physical and/or chemical properties set forth in the U.S. Department of Defense specifications numbered MiL-H-87257, MiL-H-5306, and MiL-H-83282. For example, suitable hydraulic fluids include hydraulic fluids that are one or more of petroleum-based, water based, silicone based, and/or phosphate-ester based and that embody one or more of the physical and/or chemical properties set forth in the U.S. Department of Defense specifications numbered MiL-H-87257, MiL-H-5306, and MiL-H-83282. For example, a suitable hydraulic fluid includes the phosphate-ester based hydraulic fluid available under the SKYDROL mark from Solutia Inc., a subsidiary of Eastman Chemical Company.

In various embodiments, the snubber ring is not particularly limited and may include a continuous snubber ring (e.g., a solid snubber ring) or a split snubber ring. The number, shape, and size of orifices of the snubber ring are not particularly limited and may be modified in various embodiments. For example, in various embodiments, the snubber ring may comprise a single ring of cylindrical rebounding orifices circumferentially disposed within the volume of the snubber ring parallel to the height (as measured in the y direction as shown in FIG. 2 of the snubber ring). Furthermore, the number, shape, and size of orifices of the upper bearing carrier are not particularly limited and may be modified in various embodiments.

Piston Out-Stroke

Figure 3:
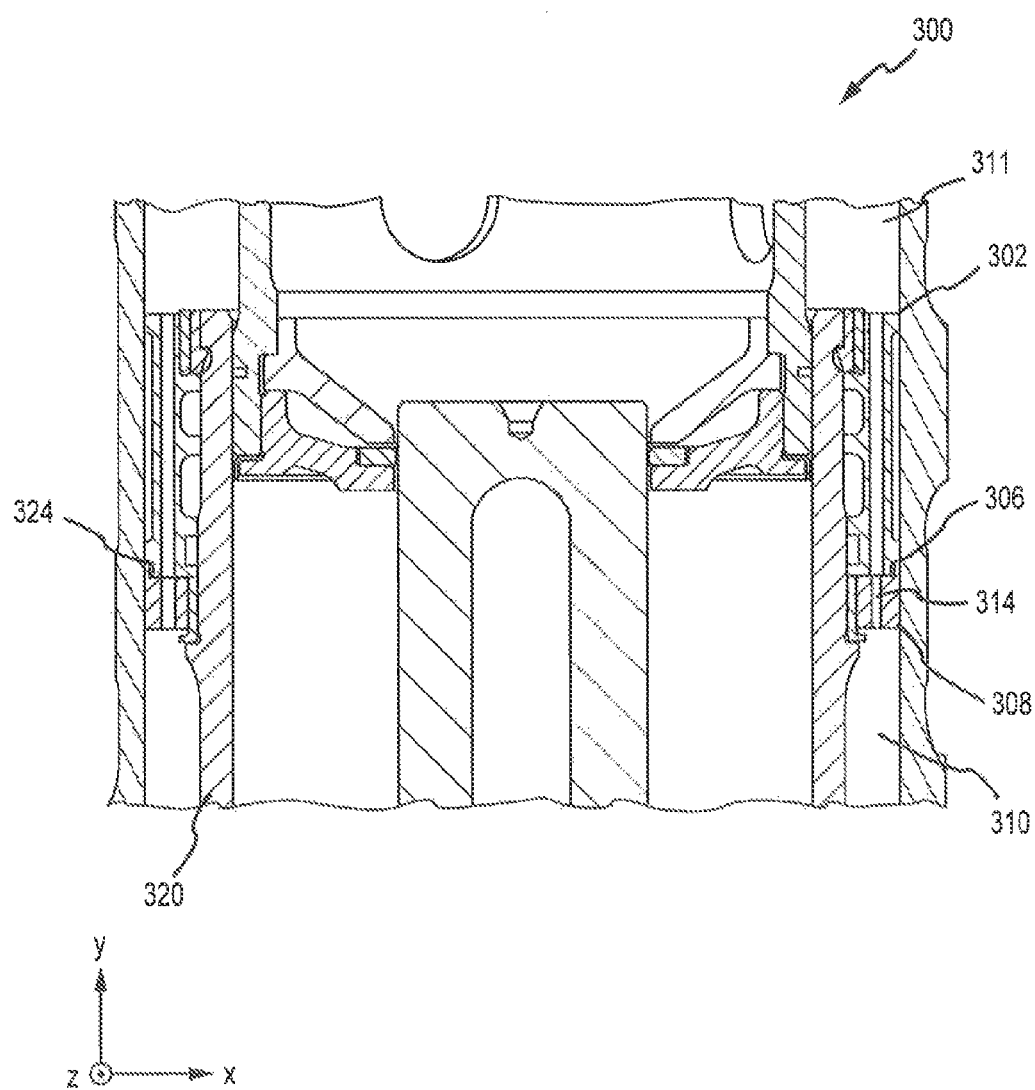
FIG. 3 illustrates a radial section view of a shock strut during piston out-stroke.
Figure 5:
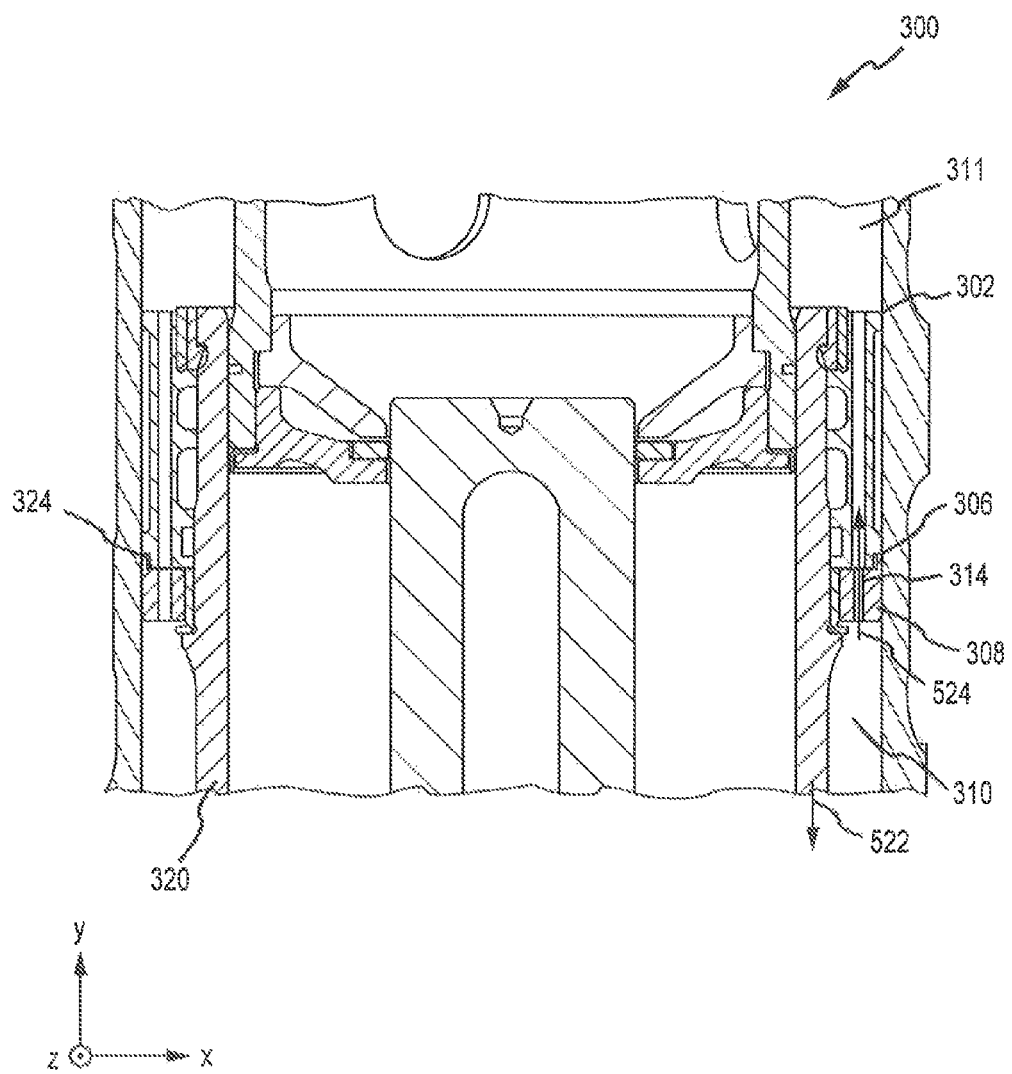
FIG. 5 illustrates a radial section view of a shock strut during piston out-stroke.

FIGS. 3 and 5 illustrate a radial section view of a shock strut during piston out-stroke in response, for example, to an extension force. During extension of shock strut 300, pressure increases in rebound chamber 310. Snubber ring 308 may be forced in the positive y direction in response to an extension force and the resulting pressure increase in rebound chamber 310. In response to an extension force, snubber ring cam surface 324 on snubber ring 308 may contact with upper bearing carrier cam surface 306 on upper bearing carrier 302. By forcing snubber ring 308 in the positive y direction, gap 214 (shown in FIG. 2) may be closed. The contact between upper bearing carrier cam surface 306 and the snubber ring cam surface 324 may rotate snubber ring 308 in a manner to prevent flow of fluid through snubber compression orifice 716 (shown in FIG. 7). Accordingly, fluid flow is forced through snubber ring rebounding orifice 314 and upper bearing carrier orifice 720 towards reservoir 311. With reference to FIG. 5, the reverse dampened flow allows fluid to flow out rebound chamber 310 in a damped flow direction 524 towards reservoir 311 while the piston translates (also referred to as telescopes) in direction 522.

Figure 6:
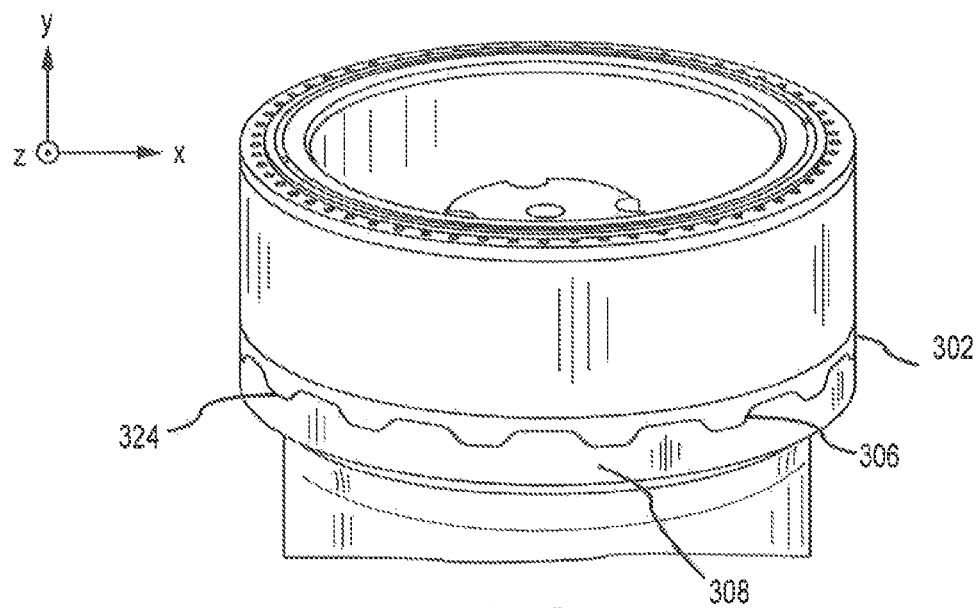
FIGS. 6 and 7 illustrate a piston during piston out-stroke.
Figure 7:
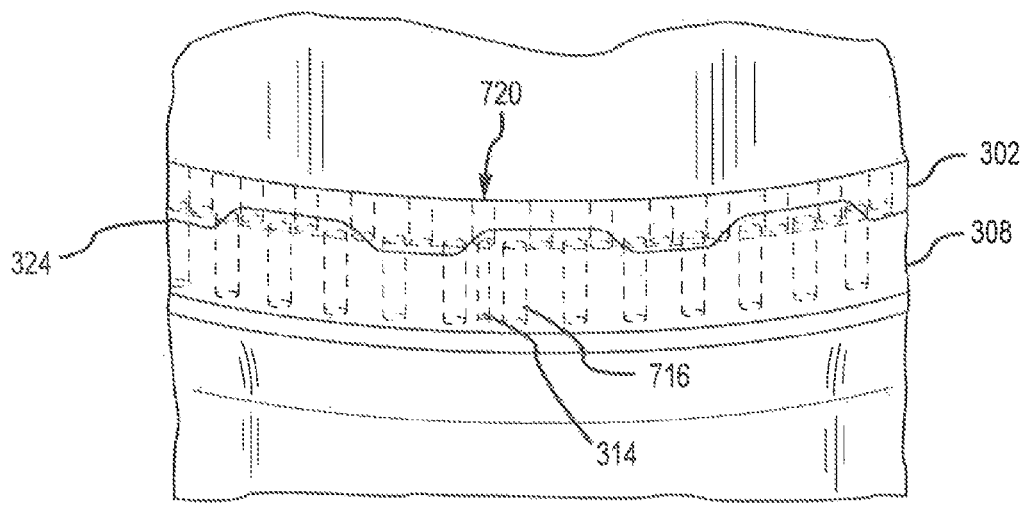

FIGS. 6 and 7 illustrate a shock strut during piston out-stroke (the cylinder is not shown), which may be in response to an extension force. During piston out-stroke, snubber ring cam surface 324 of snubber ring 308 may be in contact with upper bearing carrier cam surface 306 of upper bearing carrier 302. Snubber rebounding orifice 314 may be substantially in alignment with upper bearing carrier orifice 720 to allow fluid to flow through snubber rebounding orifice 314 and upper bearing carrier orifice 720. In various embodiments, the total cross-sectional area for fluid flow of snubber rebounding orifice 314 may be smaller than the total cross-sectional area for fluid flow of snubber compression orifice 716, which may allow fluid to flow in damped flow direction 524 (shown in FIG. 5) from a rebound chamber to a reservoir. In various embodiments, the number of snubber compression orifices and total cross-sectional area of snubber rebounding orifices (exemplified by snubber compression orifice 716) may be greater than the number of snubber rebounding orifices (exemplified by snubber rebounding orifice 314). In various embodiments, there may be multiple or singular snubber compression orifices, multiple or singular snubber rebounding orifices, and multiple or singular upper bearing carrier orifices.

In various embodiments, and with momentary reference to FIG. 6, snubber ring 308 may rotate during extension and/or compression to alter the restriction to fluid flow into and out of the rebound chamber due to interaction with upper bearing carrier cam surface 306. For example, snubber compression orifice 716 may be in contact with upper bearing carrier cam surface 306, substantially preventing fluid flow through snubber compression orifice 716 during piston out-stroke due to the rotational position of snubber ring 308 with respect to upper bearing carrier 302. In various embodiments, the prevention of fluid flow through the snubber ring compression orifice 716 may be due to the misalignment of the upper bearing carrier orifice 720 and the snubber ring compression orifice 716.

By limiting the hydraulic fluid and/or gas flow through snubber rebounding orifice 314 and upper bearing carrier rebounding orifice 720, the hydraulic fluid and/or gas may flow in damped flow direction 524 from rebound chamber 310 to reservoir 311. In various embodiments, the flow path through snubber rebounding orifice 314 and upper bearing carrier rebounding orifice 720 may be substantially linear (e.g., along the y axis). By flowing the hydraulic fluid and/or gas in damped flow direction 524 through snubber rebounding orifice 314, the extension of the landing gear after compression is dampened by reverse fluid flow out of the rebound chamber. Fluid flow through snubber compression orifice 716 and snubber rebounding orifice 314 may be controlled in part due to the position of the snubber ring 308, which may in some embodiments rotate in response to engagement with or disengagement from upper bearing carrier cam surface 306 of upper bearing carrier 302.

The rotation and rotation angle of the snubber ring is not particularly limited and may vary depending on the design of the upper bearing carrier cam surface of the upper bearing carrier and/or the design of the snubber ring cam surface of the snubber ring. For example, in various embodiments the upper bearing cam surface may limit the rotation angle of the snubber ring from a rotation of 15 degrees or less, about 10 degrees or less, or about 5 degrees or less. In various embodiments, the snubber ring is allowed to continuously rotate in a clockwise or counter clockwise direction. In various embodiments, the snubber ring will alternate between a clockwise direction (e.g., during compression) and then return to the original position by rotating in a counterclockwise direction (e.g., during extension).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A system comprising:
an upper bearing carrier, wherein the upper bearing carrier includes an upper bearing carrier cam surface, and an upper bearing carrier orifice, wherein the upper bearing carrier orifice is disposed substantially perpendicular to the upper bearing carrier cam surface;

a snubber ring comprising a snubber ring compression orifice, a snubber ring rebounding orifice, and a snubber ring cam surface, wherein the snubber ring compression orifice and the snubber ring rebounding orifice are disposed substantially perpendicular to the snubber ring cam surface;

a cylinder coupled to the upper bearing carrier, wherein a piston is mounted to slide telescopically within the cylinder, wherein, in response to an extension force, the snubber ring rotates with respect to the upper bearing carrier and the snubber ring cam surface engages the upper bearing carrier cam surface, causing the snubber ring compression orifice and the upper bearing carrier orifice to misalign.

2. The system according to claim 1, wherein the snubber ring is a solid snubber ring.

3. The system according to claim 1, wherein the snubber ring rotates in response to interaction with the upper bearing carrier cam surface.

4. The system according to claim 1 further comprising a fluid.

5. The system according to claim 1, wherein the snubber ring rotates less than 15 degrees.

6. The system according to claim 1, wherein in response to a compressive force the snubber ring compression orifice and the upper bearing carrier orifice substantially align.

7. The system according to claim 1, wherein the snubber ring rebounding orifice has a smaller cross-sectional area than the snubber ring compression orifice.

8. A system comprising:

an upper bearing carrier, wherein the upper bearing carrier includes an upper bearing carrier cam surface, and an upper bearing carrier orifice, wherein the upper bearing carrier orifice is disposed substantially perpendicular to the upper bearing carrier cam surface;

a snubber ring comprising a snubber ring compression orifice, a snubber ring rebounding orifice, and a snubber ring cam surface, wherein the snubber ring compression orifice and the snubber ring rebounding orifice are disposed substantially perpendicular to the snubber ring cam surface;

a cylinder coupled to the upper bearing carrier, wherein a piston is mounted to slide telescopically within the cylinder, wherein, in response to a compressive force, the snubber ring cam surface disengages from and rotates with respect to the upper bearing carrier cam surface.

9. The system according to claim 8, wherein the snubber ring rotates due to interaction with the upper bearing carrier cam surface in response to an extension force.

10. The system according to claim 8, wherein the snubber ring comprises more snubber ring compression orifices than snubber ring rebounding orifices.

11. The system according to claim 8, wherein the snubber ring is a solid snubber ring.

12. The system according to claim 8, wherein the snubber ring rebounding orifice has a smaller cross-sectional area for fluid flow than the snubber ring compression orifice.

13. The system according to claim 8, wherein the system is part of an aircraft landing gear.

14. The system according to claim 8, wherein the snubber ring rotates less than 15 degrees.

15. The system according to claim 8 further comprising a fluid.

* * * * *